US008567952B2

(12) United States Patent
Taylor

(10) Patent No.: US 8,567,952 B2
(45) Date of Patent: Oct. 29, 2013

(54) APPARATUS FOR SUPPORT AND MOVEMENT OF A CAMERA

(76) Inventor: Peter John Taylor, Hertfordshire (GB)

( * ) Notice: Subject to any disclaimer, the term of this patent is extended or adjusted under 35 U.S.C. 154(b) by 296 days.

(21) Appl. No.: 12/988,128

(22) PCT Filed: Apr. 15, 2009

(86) PCT No.: PCT/GB2009/050373
§ 371 (c)(1),
(2), (4) Date: Dec. 3, 2010

(87) PCT Pub. No.: WO2009/127871
PCT Pub. Date: Oct. 22, 2009

(65) Prior Publication Data
US 2011/0080564 A1 Apr. 7, 2011

(30) Foreign Application Priority Data
Apr. 18, 2008 (GB) .................... 0807106.0

(51) Int. Cl.
G03B 17/00 (2006.01)
G03B 17/24 (2006.01)

(52) U.S. Cl.
USPC ............................ 352/243; 396/420; 396/428

(58) Field of Classification Search
USPC .................. 352/243; 396/419, 420, 421, 428; 248/364
See application file for complete search history.

(56) References Cited

U.S. PATENT DOCUMENTS 3,044,346 A * 7/1962 Fieux ............................ 352/243
3,776,494 A * 12/1973 Baucheron .................... 248/656
4,017,168 A 4/1977 Brown
4,247,067 A * 1/1981 Smith ...................... 248/123.11
5,323,942 A 6/1994 Dahan
5,890,025 A 3/1999 Hart
5,940,644 A * 8/1999 Putora ........................... 396/421
6,056,449 A * 5/2000 Hart .............................. 396/421
6,773,110 B1 * 8/2004 Gale ............................. 352/243
7,232,265 B1 * 6/2007 Price ............................. 396/428
7,703,995 B1 * 4/2010 Sivan ............................ 396/421
2005/0117898 A1 * 6/2005 DeSorbo et al. ............. 396/422
2006/0285844 A1 12/2006 Hershenzon

FOREIGN PATENT DOCUMENTS

| DE | 2541895 | 3/1977 |
| DE | 202007005393 | 9/2007 |
| EP | 0755896 | 1/1997 |
| WO | 2006079175 | 8/2006 |

OTHER PUBLICATIONS

International Search Report dated Aug. 14, 2009 in PCT application.
GB Search Report dated Jun. 9, 2008 in GB0807106.0.
GB Examination Report dated Jan. 27, 2012 in GB0807106.0.

* cited by examiner

Primary Examiner — William C Dowling
(74) Attorney, Agent, or Firm — Young & Thompson

(57) ABSTRACT

The apparatus comprises a vest 10 worn by a user 1 and having on its shoulders pivots 12 for an telescoping boom 20. A camera 38 is mounted on a standard mount 32 on a cross-member extending between side members 16 of the boom. A counterweight 28 provides balance to produce quasi-neutral positioning of the boom and camera and thus its ready pivoting by the user. Pistol grips 16, 18 provide for extension of the boom and panning/tilting of the camera. A monitor screen 36 allows the user to view the picture seen by the camera.

23 Claims, 3 Drawing Sheets

APPARATUS FOR SUPPORT AND MOVEMENT OF A CAMERA

This invention relates to apparatus for support and movement of cameras. The invention is applicable to all kinds of cameras, whether digital or film, including still cameras and movie cameras. The apparatus of the invention is particularly suitable for use with high definition ("HD") video cameras which are often used in shooting videos and movies.

Many kinds of apparatus for the support and movement, either prior to or during use, of cameras are known. These range from simple tripods for positioning still cameras prior to shooting to wheeled trolleys known as "dollies" for the support and movement of large movie cameras during the shooting of films.

An apparatus for supporting a video camera and holding it steady in a substantially fixed relative position close to an operator is also known. This apparatus is known as a STEADICAM® and consists of a counterbalanced substantially vertical post to the upper end of which a camera is attached. The device is attached to a belt part of a special vest which is worn by the operator. As the operator moves, the camera "floats" relatively smoothly around a substantially fixed position relative to the operator as it follows the operator who can move around relatively freely without producing undesirable jerking of the camera position. The device is widely used for filming sporting events, particularly sportsmen moving relatively close to the camera operator.

Despite the range of apparatus available, a need remains for a device which can be light in weight and simple to operate whilst providing for a wide range of movement (in terms of both distance and kind of movement) of a camera, particularly a movie or video camera, relative to an operator. The present invention addresses this need.

The present invention provides an apparatus for support and movement of a camera relative to an operator of the camera, the apparatus comprising a means for reception of the operator, a boom pivotally mounted at a proximal end thereof on the reception means adjacent, in use of the apparatus, the shoulders of the operator and having adjacent its distal end a means for mounting a camera, and counterbalancing means arranged to counterbalance the weight of the boom and a camera mounted thereon in use of the apparatus during pivotal movement of the boom relative to the reception means.

Such an apparatus can be arranged to provide a wide range of camera movements relative to the operator, for a wide range of different cameras.

In one kind of apparatus according to the invention, the reception means comprises a seat for receiving an operator in a sitting position.

Advantageously, the seat has a backrest portion and the boom is pivotally mounted on the backrest portion adjacent an upper end thereof.

Preferably, the seat is mounted on a wheeled platform.

Conveniently, the seat is rotatable relative to the platform about a substantially vertical axis.

The apparatus may include an extensible strut extending between a first location on the boom displaced from the proximal end towards the distal end and a second location on the seat.

In another kind of apparatus according to the invention, the reception means is shaped to be worn on the upper part of the body of the operator, the reception means preferably being shaped to cover the operator's shoulders.

More preferably, the reception means is in the form of a vest which fits around the upper torso of the operator.

Advantageously, the boom is pivotally mounted on the reception means in a position corresponding to the upper surface of at least one of the operator's shoulders.

Conveniently, the length of the boom is adjustable by the operator. This provides for a tracking action of the camera.

Preferably, the camera-mounting means are pivotable by the operator relative to the boom about a horizontal axis. This provides for a tilting action.

Also, the camera-mounting means preferably allows for pivotable movement of the camera by the operator about a vertical axis. This provides for a panning action.

Preferably, the apparatus includes means, for example a parallelogram linkage, to maintain the camera mount in a horizontal orientation throughout pivotal movement of the boom.

Conveniently, the apparatus includes a pistol grip positioned on the boom to be gripped by the operator and arranged to control the movement of the camera-mounting means relative to the boom.

Preferably, the apparatus includes a pistol grip positioned on the boom to be gripped by the operator and arranged to control the length of the boom.

The counterbalancing means advantageously includes means for pre-loading the boom against pivotal movement. The pre-loading means are preferably adjustable.

Conveniently, the boom comprises first and second spaced members extending from respective pivots adjacent the shoulders of the user, the members being joined by at least one crossmember.

Advantageously, the crossmember is adjacent the distal end of the boom and the camera-mounting means is on the crossmember.

For adjustment of the boom length, each boom member comprises two or more telescoping sections.

Preferably, the counterbalancing means comprise an extension portion of the boom extending rearwardly from the pivoted mounting of the boom. The counterbalancing means conveniently includes a counterweight.

Embodiments of the invention will now be described by way of example with reference to the drawings, in which.

Figure 1:
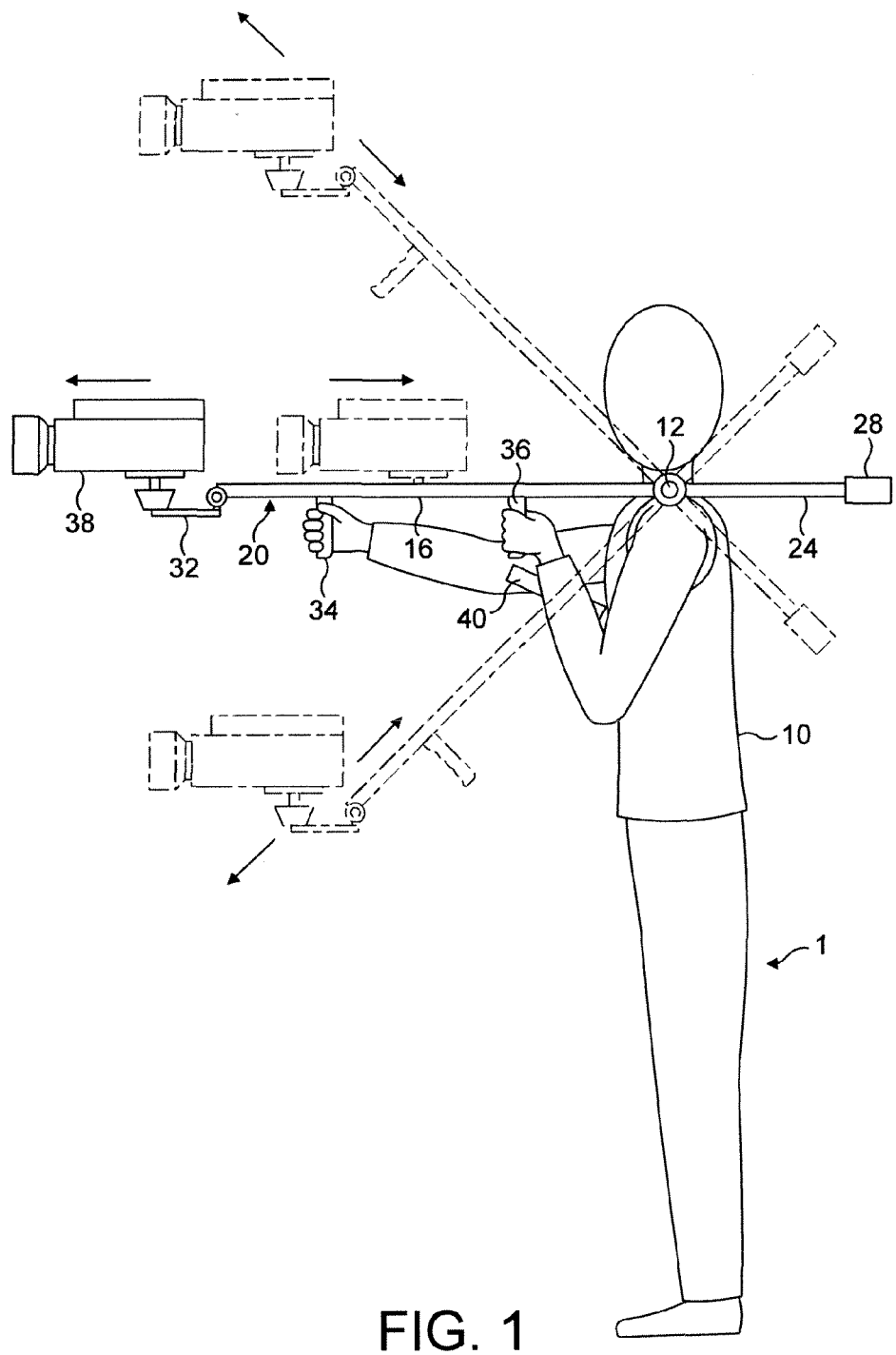
FIG. 1 is a side view of a camera-supporting apparatus shown in three alternative positions, in use by an operator.

Referring first to FIG. 1 of the drawings, this shows a camera operator 1 wearing a vest 10 which forms part of a camera-supporting apparatus. The apparatus includes left and right shoulder-mounted pivot bearings 12, 14 which are attached to respective shoulder portions of the vest 10. On each pivot bearing, a respective side member 16, 18 of a camera boom 20 is pivotally attached. The boom 20 also comprises a crossmember 22 which is visible in FIG. 2 of the drawings.

Each side member 16, 18 consists of a pair of telescoping tubes, extending forwardly from the respective pivot bearing 12, 14, and a respective rear extension portion 24, 26 which, as shown in the drawings, is located behind the neck or shoulders of the operator 1. The rear extension portions 24, 26 carry a counterweight 28 which is slidable on the rear extensions 24, 26 of the side members 16, 18 of the boom 20. A further crossmember 30 extends between the side member rear extensions 24, 26 behind the shoulders of the operator.

Each pivot bearing 12, 14 is provided with a pre-loading means which is adjustable by the operator and can be pre-set according to the load to be placed on the boom 20 by the camera with which the apparatus is to be used. The pre-set force produced by the pre-loading means produces a neutral or quasi-neutral balanced position of the apparatus on the operator's shoulders. Suitable pre-loading means are devices of, or similar to, the known kind used in camera tripod heads to produce a neutral, balanced position of a camera which is tiltable in a vertical plane. Such devices typically contain a spring which can be tensioned to provide the pre-loading force by means such as a crank handle or a lever movable between a number of positions corresponding to different pre-set loadings. The pre-loading means can replace or supplement the counterweight 28.

In another arrangement, counterbalancing of the boom could be provided for by an arrangement of one or more springs acting between the side member rear extensions 24, 26 or the crossmember 30 and an anchorage on the vest 10 behind the back of the operator. This arrangement could also replace or supplement the counterweight 28, or replace or supplement the pre-loading means referred to above. The arrangement would also serve to redistribute part of the load of the apparatus on the operator from the shoulders to the back of the operator.

In another, modified arrangement, damping means could be provided between the pivot bearings 12, 14 and the shoulder of the vest 10, in order to produce a shock-absorbing effect.

A camera mount 32 is located at the centre of the front crossmember 22. The camera mount 32 is of known type which includes a threaded screw for reception in a standard socket in a camera body. The mount further includes servo motors which control the panning and tilting movements (in, respectively, horizontal and vertical arcs) of a mounted camera in response to suitable input signals. A first pistol grip 34 for engagement by the right hand of the operator 1 is connected to the camera mount 32 and controls the input signals to the servo motors, allowing the operator to control the panning and tilting movements of the mount. To facilitate this, the pistol grip can be arranged to move in two dimensions in the manner of a joystick. Any batteries needed for powering the servo motors can be housed in suitable pockets in the vest 10.

The first pistol grip 34 also allows the operator 1 to control the telescoping of the tubes of the side members 16, 18, in order to lengthen and shorten the side members 16, 18. The distance of the camera mount 32 from the operator is thus controlled and thereby the tracking movement of a camera on the mount.

A second pistol grip 36 located on the left hand side member 18 of the boom 20 allows for the pivotal movement of the boom 20 about the pivot bearings 12, 14 and is positioned for convenient gripping by the left hand of the operator. The second pistol grip thereby allows the operator 1 to control the tilt of the boom 20 about the pivot bearings 12, 14 and thus the vertical position of the camera mount relative to the operator. To ensure that the camera mount 32 remains in a horizontal orientation throughout this movement, a suitable parallelogram linkage (not shown) can be provided between the mount 32 and the front crossmember 22.

Figure 2:
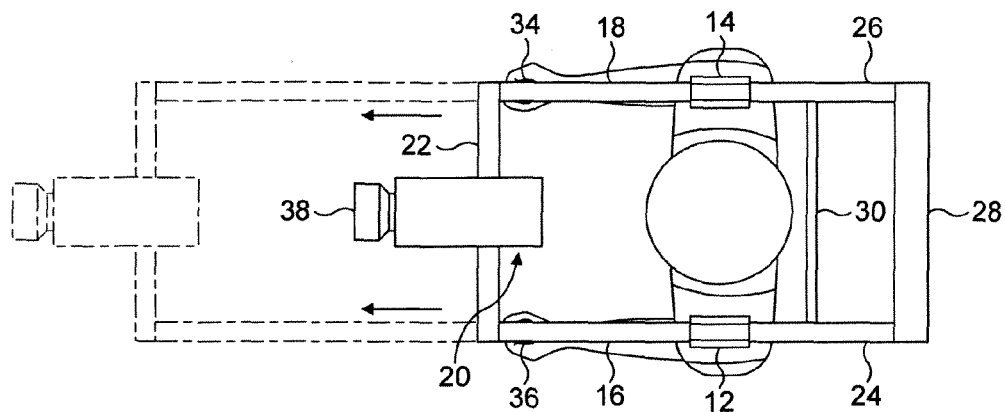
FIG. 2 is a view from above of the apparatus and operator of FIG. 1.

FIGS. 1 and 2 of the drawings show a camera 38 mounted on the camera mount 32 in the conventional manner using the screw on the mount 32 which is received in a standard-sized threaded socket in the base of the body of the camera 38. Alternatively, if desired, a quick-release slideplate with a dovetail fitting can be used between the camera body and the mount 32. The camera 38 shown is an HD video camera recording on a magnetic tape or a solid state chip; it could instead be a still camera, film or digital, or a movie film camera of suitable size.

Figure 3:
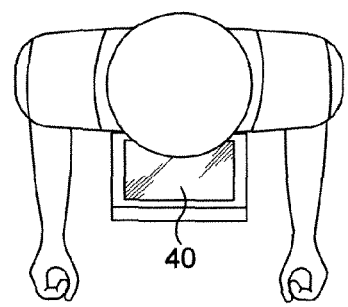
FIG. 3 shows the operator of FIGS. 1 and 2 from above and in front with parts of the camera-supporting apparatus omitted.

FIG. 3 shows a monitor screen 40 which is attached to the front of the vest 10 and is positioned for convenient viewing by the operator 1. The screen 40 is connected by suitable cabling (not shown) to the camera 38 so that the operator can view on the screen the image seen by the camera 38 at any time.

Figure 4:
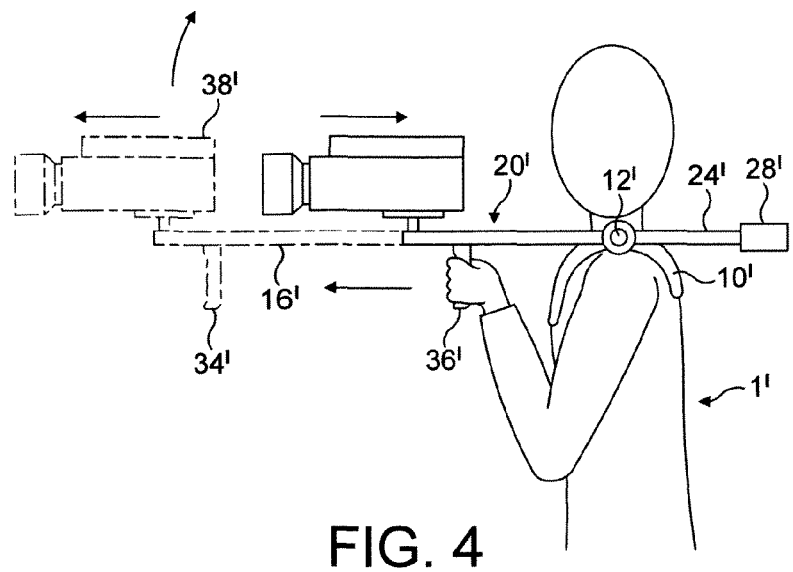
FIG. 4 is a view corresponding to FIG. 1 but showing a modified apparatus.

FIG. 4 shows a modified and somewhat simplified version of the apparatus shown in FIGS. 1 to 3. This modified version is intended for use with smaller, lighter cameras. Parts corresponding to parts of the device shown in FIGS. 1 to 3 are indicated by the same reference numerals primed. Only the features which differ significantly will be described here. These features are that the boom 20' is somewhat shorter, both in front of and behind the operator 1', and that the vest 10 is replaced by a collar 10' which fits over the shoulders of the user 1' and provides the pivot bearings 12', 14'. In the device of FIG. 4, there is no monitor screen since the shorter boom 20' means that the operator 1' is near enough to the camera 38' to be able to see the monitor screen of the camera.

The apparatus shown in FIG. 4 could be further modified by use of a camera mount which, instead of servo motors for control of pan and tilt, is formed to comprise a resilient rubber block which provides for sleek movements by the operator's direct manipulation of the camera body. In addition, the equivalent of panning movement of the camera can be achieved by turning movement of the operator's shoulders.

The various modifications of the FIG. 4 embodiment can be applied individually or in any combination to the embodiment of FIGS. 1 to 3.

Figure 5:
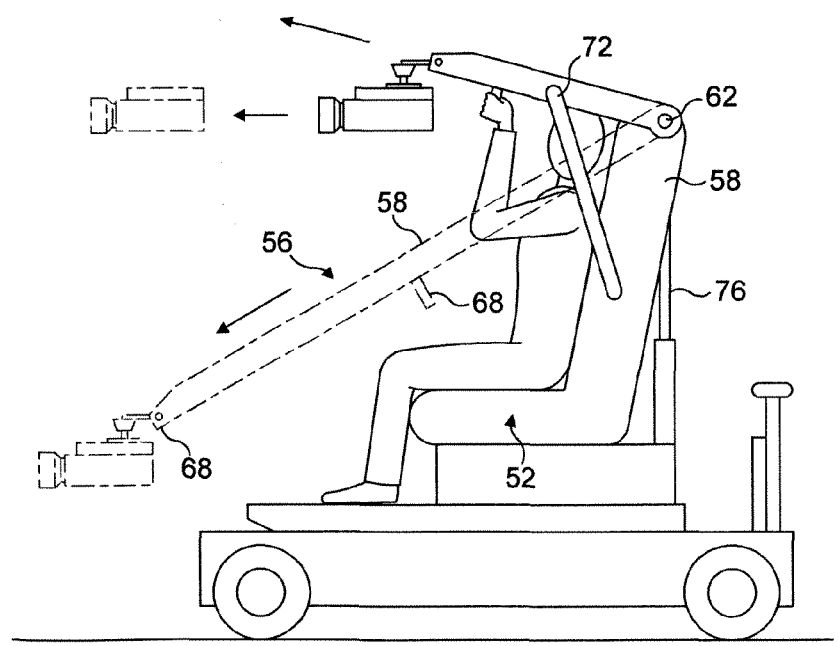
FIG. 5 is a view corresponding to FIG. 1 of another camera-supporting apparatus, shown in two alternative conditions.

FIG. 5 of the drawings shows another camera-supporting apparatus which, instead of being supported on the shoulders of an operator who stands to use the apparatus, includes a wheeled "dolly" 50 on which a seat 52 for the operator is mounted. The seat 52 can turn on the dolly about a vertical axis passing centrally through a cushion part 54 of the seat. The seat can be freely rotatable by the operator using his/her feet on a suitably-positioned footplate (not shown). A hand- or foot-operated brake could be provided to allow the operator to restrain the seat against rotation.

Rather than being mounted on a vest or collar worn by the operator, the boom 56 of the device shown in FIG. 5 is pivotally mounted on a backrest part 58 of the seat 52, adjacent its upper end and thus close behind the operator's head and shoulders. The boom 56 comprises left and right side members 58, 60 which are each pivoted on the backrest 58 at a respective pivot bearing 62, 64. Each side member 58, 60 consists of telescoping tubes which thus allow for extension and contraction of the boom 56. The outer ends of the side members 58, 60 are joined by a crossmember 66 which has a camera mount 68 at its mid-point, the mount 68 again being pivotable about the axis of the crossmember 66. Pistol grips 68, 70 provide as in the first embodiment for tilting movement of the camera mount on the crossmember 66 and for extension of the boom. There is again a monitor screen (not shown) for viewing the image seen by the camera.

Instead of being counterbalanced by rear extension portions and a counterweight as in the first embodiment, the boom of the apparatus of the second embodiment is supported by first and second telescoping struts 72, 74 pivotally attached at their ends to respective boom side members 58, 60 and to each side of the seat backrest 58 lower down than the boom pivot bearings 62, 64. An hydraulic ram 76 provides for counterbalancing of the boom 56 and camera. Suitable servo motors and controls can be provided for operator controlled powered extension and retracting of the boom 56 by way of the left-hand pistol grip 68. In another modification, the tilting movement of the boom could be controlled by a second operator.

The use of the apparatus shown in FIGS. 1 to 5 will now be described, starting with the embodiment of FIGS. 1 to 3.

First, the camera 38 to be used, which may be a video or still camera, is mounted on the camera mount 32 in the usual way by screwing of the screw of the camera mount into the socket provided in the camera body. The camera is then connected electrically and in any other way necessary for viewing of the image seen by the camera on the monitor screen 36. The operator 1 now dons the vest 10 and the camera can be used to record images, the boom 20 being movable pivotally using the left-hand pistol grip 36 between the lower and upper positions shown in FIG. 1, through the middle position also shown. The camera 38 can also be moved with a panning or a tilting action by use of the right-hand pistol grip 34. During such movement the rear extension portions 24, 26 of the side frames 16, 18 pivot, together with the counterweight 28 in the opposite direction around the pivot bearings 12, 14 and provide suitable counterbalancing for the camera 38 which is thereby maintained in a quasi-neutral position where it will "float" from position to position in response to relatively minor input from the user. It also arranged for the camera 38 to tilt on the parallelogram linkage about its bearing on the front cross member 30 during tilting movement of the boom 20 so that a horizontal orientation of the camera is maintained throughout such movement.

FIG. 2 of the drawings shows the tracking movement of the camera between a first position shown nearer the user and a second position in which the telescoping side members 16, 18 of the boom 20 are extended to their maximum extent.

The modified apparatus shown in FIG. 4 is used in a manner very similar to that in which the device of FIGS. 1 to 3 is used, the principal difference being that the operator 1' wears only the support collar 10' and not the full vest 10. Also, an account of the shorter boom 20', the range of zooming movement is lesser than with the device of FIGS. 1 to 3.

The second embodiment shown in FIG. 5 is used similarly to the first embodiment with the main difference that the operator sits in the seat 52 rather than stands. The dolly 50 on which the seat is mounted can be moved on its wheels by being pushed or pulled by other operatives; the seat 52 can be rotated on the dolly about a vertical axis. These movements produce camera movement equivalent to that produced by the operator 1, 1' of the other devices walking or otherwise moving around.

In use of the second embodiment the camera is mounted as before on the camera mount and can be panned and tilted by the seated operator using the right-hand pistol grip, whilst the boom can be pivoted and extended or contracted using the left-hand pistol grip. As with the first embodiment, a substantial range of camera movements is obtained.

The invention claimed is:

1. An apparatus for support and movement of a camera relative to an operator of the camera, the apparatus comprising:
   a means for reception of the operator,
   a boom pivotally mounted adjacent one end of the boom on the reception means adjacent, in use of the apparatus, shoulders of the operator and having adjacent an opposite end of the boom means for mounting a camera, and
   counterbalancing means arranged to counterbalance a weight of the boom and a camera mounted thereon in use of the apparatus during pivotal movement of the boom relative to the reception means,
   wherein a length of the boom is adjustable by the operator.

2. An apparatus according to claim 1, in which the reception means comprises a seat for receiving the operator in a sitting position.

3. An apparatus according to claim 2, in which the seat has a backrest portion and the boom is pivotally mounted on the backrest portion adjacent an upper end thereof.

4. An apparatus according to claim 2, in which the seat is mounted on a wheeled platform.

5. An apparatus according to claim 4, in which the seat is rotatable relative to the platform about a substantially vertical axis.

6. An apparatus according to claim 2, including an extensible strut extending between a first location on the boom displaced from the one end towards the opposite end and a second location on the seat.

7. An apparatus according to claim 1, in which the reception means is shaped to be worn on an upper part of the body of the operator.

8. An apparatus according to claim 7, in which the reception means is shaped to cover the operator's shoulders.

9. An apparatus according to claim 8, in which the reception means is in the form of a vest which fits around the upper torso of the operator.

10. An apparatus according to claim 8, in which the boom is pivotally mounted on the reception means in a position corresponding to an upper surface of at least one of the operator's shoulders.

11. An apparatus according to claim 1, in which the camera-mounting means are pivotable by the operator relative to the boom about a horizontal axis.

12. An apparatus according to claim 1, in which the camera-mounting means allows for pivotable movement of the camera by the operator about a vertical axis.

13. An apparatus according to claim 1, including means to maintain the camera mount in a horizontal orientation throughout pivotal movement of the boom.

14. An apparatus according to claim 11, including a pistol grip positioned on the boom to be gripped by the operator and arranged to control the movement of the camera-mounting means relative to the boom.

15. An apparatus according to claim 11, including a pistol grip positioned on the boom to be gripped by the operator and arranged to control the length of the boom.

16. An apparatus according to claim 1, in which the counterbalancing means include means for preloading the boom against pivotal movement.

17. An apparatus according to claim 16, in which the preloading means are operator-adjustable.

18. An apparatus according to claim 1, in which the boom comprises first and second spaced apart boom members extending from respective pivots adjacent the shoulders of the user, the boom members being joined by at least one crossmember.

19. An apparatus according to claim 18, in which the crossmember is adjacent the opposite end of the boom and the camera-mounting means is on the crossmember.

20. An apparatus according to claim 18, in which each said boom member comprises two or more telescoping sections.

21. An apparatus according to claim 1, in which the counterbalancing means comprise an extension portion of the boom extending rearwardly from the pivoted mounting of the boom.

22. An apparatus according to claim 21, in which the counterbalancing means includes a counterweight.

23. An apparatus for support and movement of a camera relative to an operator of the camera, the apparatus comprising:
- a means for reception of the operator, including a seat for receiving the operator in a sitting position;
- a boom pivotally mounted adjacent one end of the boom on the reception means adjacent, in use of the apparatus, shoulders of the operator and having adjacent an opposite end of the boom means for mounting a camera;
- counterbalancing means arranged to counterbalance a weight of the boom and a camera mounted thereon in use of the apparatus during pivotal movement of the boom relative to the reception means; and
- an extensible strut extending between a first location on the boom displaced from the one end towards the opposite end and a second location on the seat.

\* \* \* \* \*

UNITED STATES PATENT AND TRADEMARK OFFICE
CERTIFICATE OF CORRECTION

PATENT NO.        : 8,567,952 B2                                              Page 1 of 1
APPLICATION NO. : 12/988128
DATED             : October 29, 2013
INVENTOR(S)       : Peter John Taylor It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this
Fifteenth Day of September, 2015

Michelle K. Lee
*Director of the United States Patent and Trademark Office*